(12) United States Patent
Punsalan et al.

(10) Patent No.: US 7,504,013 B2
(45) Date of Patent: Mar. 17, 2009

(54) SYSTEM AND A METHOD FOR MANUFACTURING AN ELECTROLYTE USING ELECTRO DEPOSITION

(75) Inventors: David Punsalan, Eugene, OR (US); Gregory Herman, Albany, OR (US); Peter Mardilovich, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 858 days.

(21) Appl. No.: 10/705,486

(22) Filed: Nov. 10, 2003

(65) Prior Publication Data

US 2005/0098438 A1     May 12, 2005

(51) Int. Cl.
   *C25D 1/00*     (2006.01)
   *C25D 1/20*     (2006.01)
   *C25D 15/00*     (2006.01)
   *C25D 15/02*     (2006.01)
   *C25D 9/02*     (2006.01)

(52) U.S. Cl. .................. 205/67; 205/109; 205/317

(58) Field of Classification Search ............... None
See application file for complete search history.

(56) References Cited

U.S. PATENT DOCUMENTS

| | | | | |
|---|---|---|---|---|
| 3,879,275 A * | 4/1975 | Cressman et al. | ............ | 204/165 |
| 4,797,183 A * | 1/1989 | Yamamoto et al. | ............ | 205/50 |
| 4,952,293 A * | 8/1990 | Sypula et al. | ............ | 204/479 |
| 5,079,121 A * | 1/1992 | Facci et al. | ............ | 430/62 |
| 5,281,327 A * | 1/1994 | Honda et al. | ............ | 205/198 |
| 5,334,292 A * | 8/1994 | Rajeshwar et al. | ............ | 205/419 |
| 5,702,755 A | 12/1997 | Mussell | | |
| 5,759,712 A | 6/1998 | Hockaday | | |
| 6,059,943 A * | 5/2000 | Murphy et al. | ............ | 204/296 |
| 6,562,446 B1 | 5/2003 | Totsuka | | |
| 6,602,630 B1 * | 8/2003 | Gopal | ............ | 429/30 |
| 6,692,857 B2 * | 2/2004 | Steenbakkers | ............ | 429/30 |
| 2003/0071259 A1 * | 4/2003 | Yoshida | ............ | 257/40 |
| 2003/0134177 A1 * | 7/2003 | Furuya | ............ | 429/42 |
| 2004/0126638 A1 * | 7/2004 | Chen et al. | ............ | 429/33 |
| 2004/0209155 A1 * | 10/2004 | Kosako et al. | ............ | 429/44 |
| 2005/0014050 A1 * | 1/2005 | Punsalan et al. | ............ | 429/33 |

FOREIGN PATENT DOCUMENTS

WO     WO 03/081707 A1 * 10/2003

OTHER PUBLICATIONS

A. Boccaccini and I. Zhitomirsky, "Application of electrophoretic and electrolytic deposition techniques in ceramics processing", 2002, Current Opinion in Solid State and Materials Science, vol. 6, pp. 251-260. No month.*

* cited by examiner

*Primary Examiner*—Harry D. Wilkins, III (57) ABSTRACT

A method of forming an electrolyte includes removably coupling a perimeter support to a temporary substrate, and electrodepositing an electrolyte composite film on the temporary substrate.

17 Claims, 7 Drawing Sheets

SYSTEM AND A METHOD FOR MANUFACTURING AN ELECTROLYTE USING ELECTRO DEPOSITION

BACKGROUND

During the past several years, the popularity and viability of fuel cells for producing both large and small amounts of electricity has increased significantly. Fuel cells conduct an electrochemical reaction with reactants such as hydrogen and oxygen to produce electricity and heat. Fuel cells are similar to batteries except that fuel cells can be "recharged" while providing power. In addition, fuel cells are cleaner than other sources of power, such as devices that combust hydrocarbons. Fuel cells provide a direct current (DC) voltage that may be used to power almost any electrical device such as, motors, lights, computers, or any number of electrical appliances.

Fuel cells typically have three component parts: an anode, a cathode, and an electrolyte. The electrolyte is sandwiched between the anode and cathode. There are several different types of fuel cells, each using a different chemistry. Fuel cells are usually classified, depending on the type of electrolyte used, into one of five groups: alkaline fuel cells (AFC), phosphoric-acid fuel cells (PAFC), solid oxide fuel cells (SOFC), molten carbonate fuel cells (MCFC), and proton exchange membrane fuel cells (PEMFC). One variant of the PEMFC technology includes direct methanol fuel cells (DMFC), in which liquid methanol is directly fed to the fuel cell as fuel.

PEMFCs typically function by supplying hydrogen to the anode. The hydrogen is used by the anode to provide protons to the electrolyte and releases electrons that pass through an external circuit to reach a cathode located opposite the anode. The protons solvate with water molecules and diffuse through the membrane to the cathode where they react with oxygen that has picked up electrons thereby forming water. PEMFCs have a number of distinct advantages over other fuel cells. PEMFCs have a very high power density (40% to 60% efficiency) and a very low operating temperature (around 80 degrees Celsius). Moreover PEMFCs do not utilize dangerous chemicals that may spill or leak. These qualities make PEMFCs extremely safe and low in maintenance requirements.

Traditionally, the proton exchange membrane (PEM) of a PEMFC has been formed by applying a solid semipermiable membrane to an electrode layer with an adhesive layer between the two. The membrane-adhesion layer electrode stack would then be compressed in the presence of heat to bond the layers together. However, traditional methods of forming PEM fuel cells tend to have a low amount of mechanical stability and are susceptible to swelling of the electrolyte. This swelling of the electrolyte often leads to increased fuel crossover resulting in degraded fuel efficiency of the fuel cell.

BRIEF DESCRIPTION OF THE DRAWINGS

The accompanying drawings illustrate various embodiments of the present invention and are a part of the specification. The illustrated embodiments are merely examples of the present invention and do not limit the scope thereof.

Throughout the drawings, identical reference numbers designate similar, but not necessarily identical, elements.

DETAILED DESCRIPTION

A method of forming an electrolyte includes removably coupling a perimeter support to a temporary substrate and electrodepositing an electrolyte composite film on the temporary substrate. The present system and method for the formation of an electrolyte will be described, for ease of explanation only, in the context of a proton exchange membrane fuel cell (PEMFC) including direct methanol fuel cells (DMFC). However, the apparatus and method described herein may be used to form the electrolyte of any type of fuel cell.

The term "electro deposition" is meant to be understood both here and in the appended claims to mean the precipitation of a material at an electrode as the result of a passage of an electric current through or an application of an electrical field on a solution or suspension of material. Similarly, the term "electrolyte" is meant to be understood broadly as referring to a substance, either solid or liquid, that will provide ionic conductivity when dissolved in water or when in contact with it. One solid electrolyte, used originally in fuel cells, is a polymer of perfluorinated sulfonic acid.

In the following description, for purposes of explanation, numerous specific details are set forth in order to provide a thorough understanding of an electrolyte formation process and apparatus. It will be apparent, however, to one skilled in the art that the electrolyte formation process and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
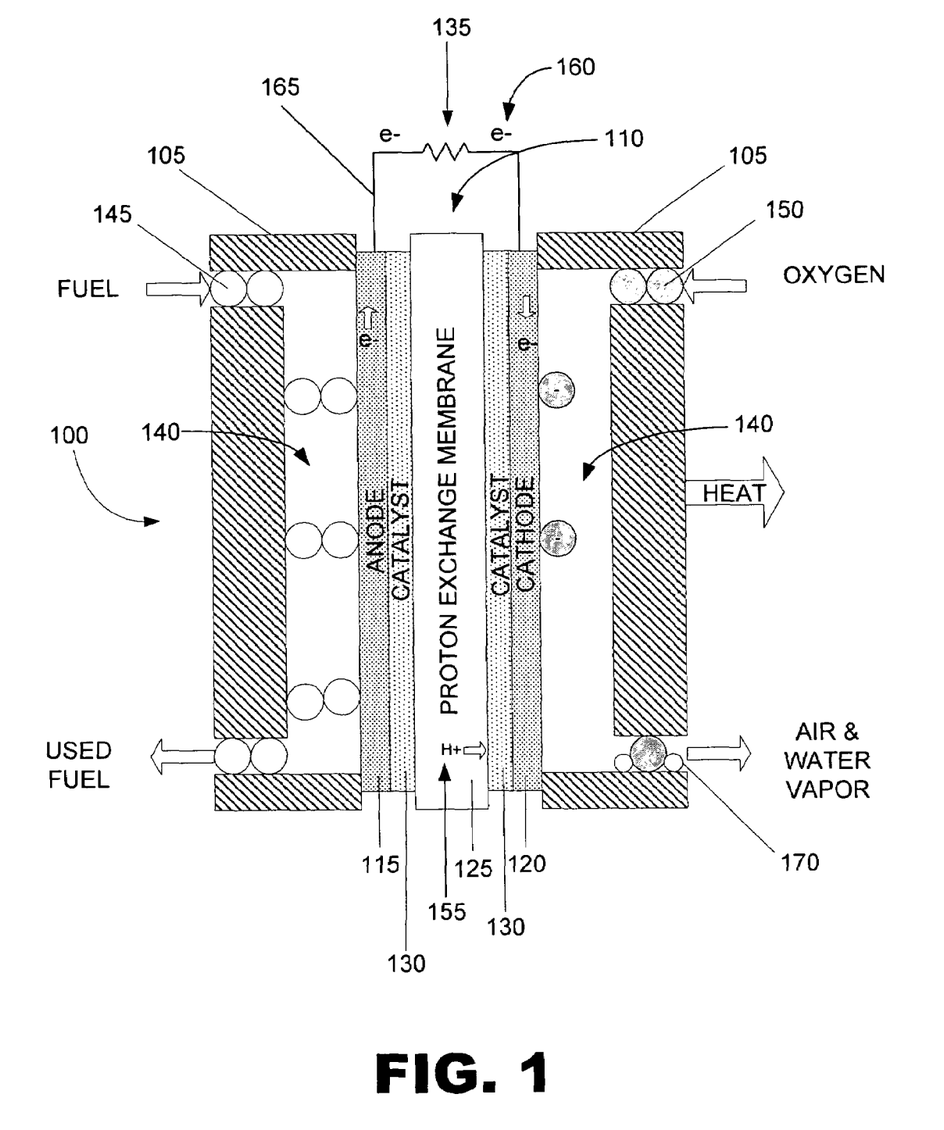
FIG. 1 illustrates a cross-sectional view of a proton exchange membrane fuel cell (PEMFC) according to one exemplary embodiment.

FIG. 1 illustrates a cross-sectional view of a proton exchange membrane fuel cell (PEMFC) (100) according to one exemplary embodiment. As illustrated in FIG. 1, a PEMFC (100) may include a housing (105) that surrounds a membrane/electrode assembly (MEA) (110). As shown in FIG. 1, the MEA (110) may include an anode (115) and a cathode (120) on opposing sides of a proton exchange membrane (PEM) (125). A catalyst (130) is also disposed on the boundary between the anode (115) and the PEM (125) as well as between the cathode (120) and the PEM (125). As illustrated in FIG. 1, the anode (115) and the cathode (120) may also be electrically coupled to an electrical load (135).

The housing (105) of the PEMFC (100) illustrated in FIG. 1 may be configured to form a number of flow chambers (140). The chambers (140) formed by the housing (105) may direct fuel (145) to the anode (115) and oxygen (150) to the cathode (120). When in operation, the fuel (145), typically hydrogen, is presented at the anode (115) where it undergoes a catalytic decomposition into both protons (155) and electrons (160). The electrons (160) are transferred from the anode (115) to an external circuit (165) and load (135) and back to the cathode (120) of the PEMFC (100). The electrons (160) that have returned to the cathode then combine with the oxygen (150) provided at the cathode (120). The protons (155) solvate with water molecules (not shown) contained by the PEM (125) and pass through the PEM (125) where they are also presented at the cathode (120). The protons (155) then join the oxygen (150), forming water molecules (170) which are exhausted.

The PEM (125) forms a crucial part of the above-mentioned process. The PEM (125) may be made of any material capable of transporting the above-mentioned protons (155), while providing resistance to gas crossover between the anode (115) and cathode (120) side including, but in no way limited to, a solid polymer electrolyte membrane such as a perfluorosulfonate ionomer and sulfonate polyetherketones membranes. Commercial examples of perfluorosulfonate ionomer membrane include NAFION, FLEMION, and DOW XUS.

Traditional methods of forming the PEM (125) and joining the PEM (125) to the electrode layers (115, 120) incorporate a hot press method which causes the perfluorosulfonate ionomer to go from a fully hydrated state to a smaller dehydrated state. When the PEMFC (100) is in operation, the perfluorosulfonate ionomer may become hydrated again causing swelling and structural instability in the PEM (125). The swelling and/or structural instability caused by the hydration of the perfluorosulfonate ionomer may result in an increase of fuel crossover within the PEMFC (100). Fuel crossover is meant to be understood as a parasitic loss of unreacted or partially reacted fuel across a fuel cell membrane, potentially leading to unwanted parasitic reactions. This loss of fuel effectively reduces the overall efficiency of the PEMFC (100). The fuel may include, but is in no way limited to, methanol (in a DMFC), isopropanol, ethanol, or any other fuel suitable for use in a fuel cell system.

Figure 2A:
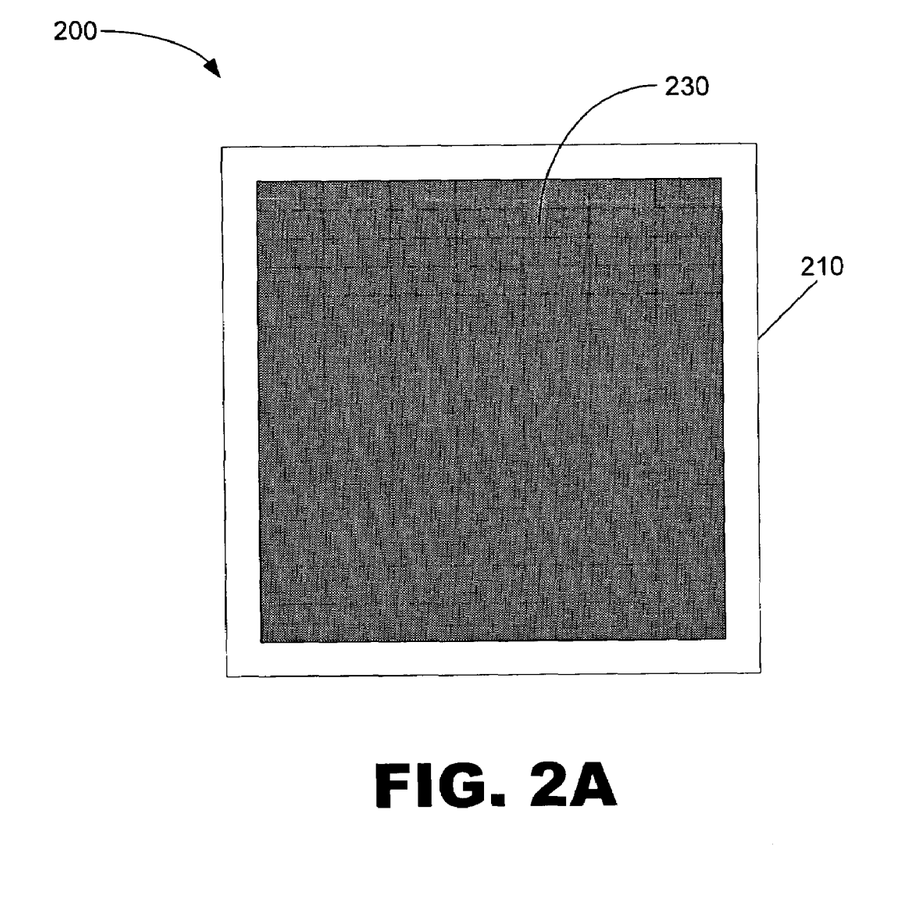
FIG. 2A illustrates an electrolyte composite film and perimeter support according to one exemplary embodiment.
Figure 2B:
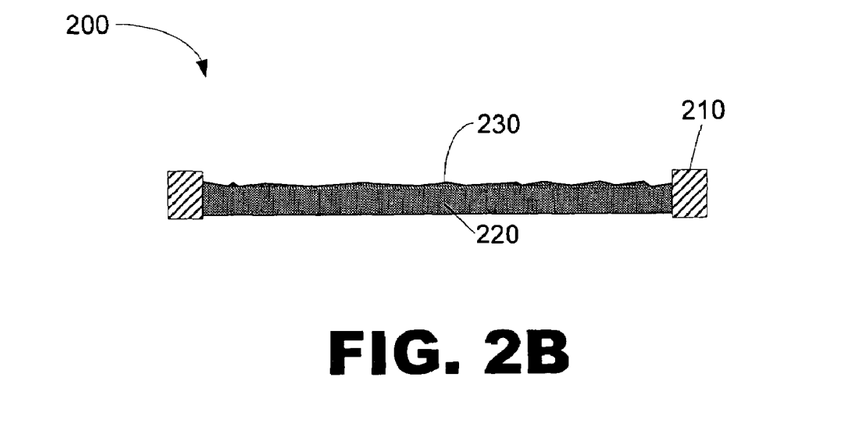
FIG. 2B illustrates a cross-sectional view of the electrolyte composite film and perimeter support of FIG. 2A.

FIGS. 2A-B show an electrolyte assembly (200) that generally includes a perimeter support (210) that supports an electrolyte composite film (220) sealed on its outer surface by a thin ion layer (230). The perimeter support (210) is configured to be removably attached to a formation system (300, FIG. 3), as will be discussed in more detail below. Further, the perimeter support (210) may be customized to suit the specific configuration of the system with which the electrolyte assembly (200) is intended to be used. Similarly, the electrolyte assembly (200) may be configured for use with a specific fuel cell system such as a PEM fuel cell system or a direct methanol (DM) fuel cell system (100, FIG. 1) in which the electrolyte assembly (200) would serve as a PEM (125, FIG. 1).

Figure 3:
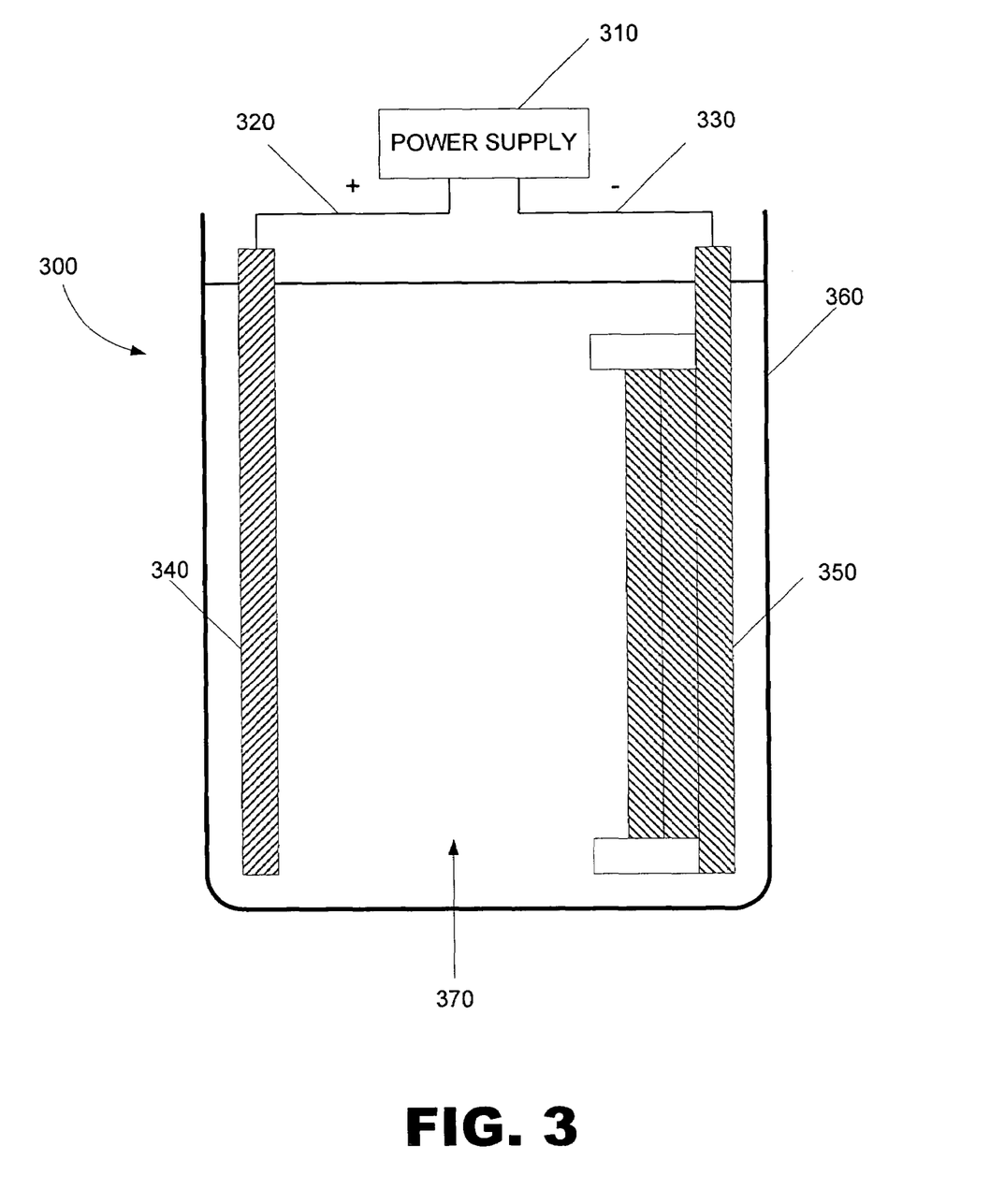
FIG. 3 is a cross-sectional view illustrating an electro deposition system according to one exemplary embodiment.

FIG. 3 shows a cross-sectional view of an electro deposition system (300) configured to form electrolyte composite and/or electrolyte films. As shown in FIG. 3, the electro deposition system (300) may include a power supply (310) having both a positive lead (320) and a negative lead (330). The positive lead (320) is electrically connected to a positively charged electrode (340). Similarly, the negative lead (330) is electrically connected to a negatively charged electrode (350), which acts as a temporary substrate. The electro deposition system (300) illustrated in FIG. 3 also shows the positively charged electrode (340) and a negatively charged electrode (350), submersed in a deposition container (360) filled with a polymeric electrolyte solution (370).

The power supply (310) illustrated in FIG. 3 is a direct current (DC) power supply capable of providing voltage to the electrodes (340, 350) sufficient to produce an electric field for the electro deposition of electrolyte composite and/or electrolyte films. Moreover the positive (320) and negative (330) leads that are electrically coupling the electrodes (340, 350) to the power supply (310) may be any electrical conductor capable of transmitting a DC signal from a power supply to electrodes including, but in no way limited to, conductive signal wire or conductive straps.

Exemplary Implementation and Operation

Figure 4:
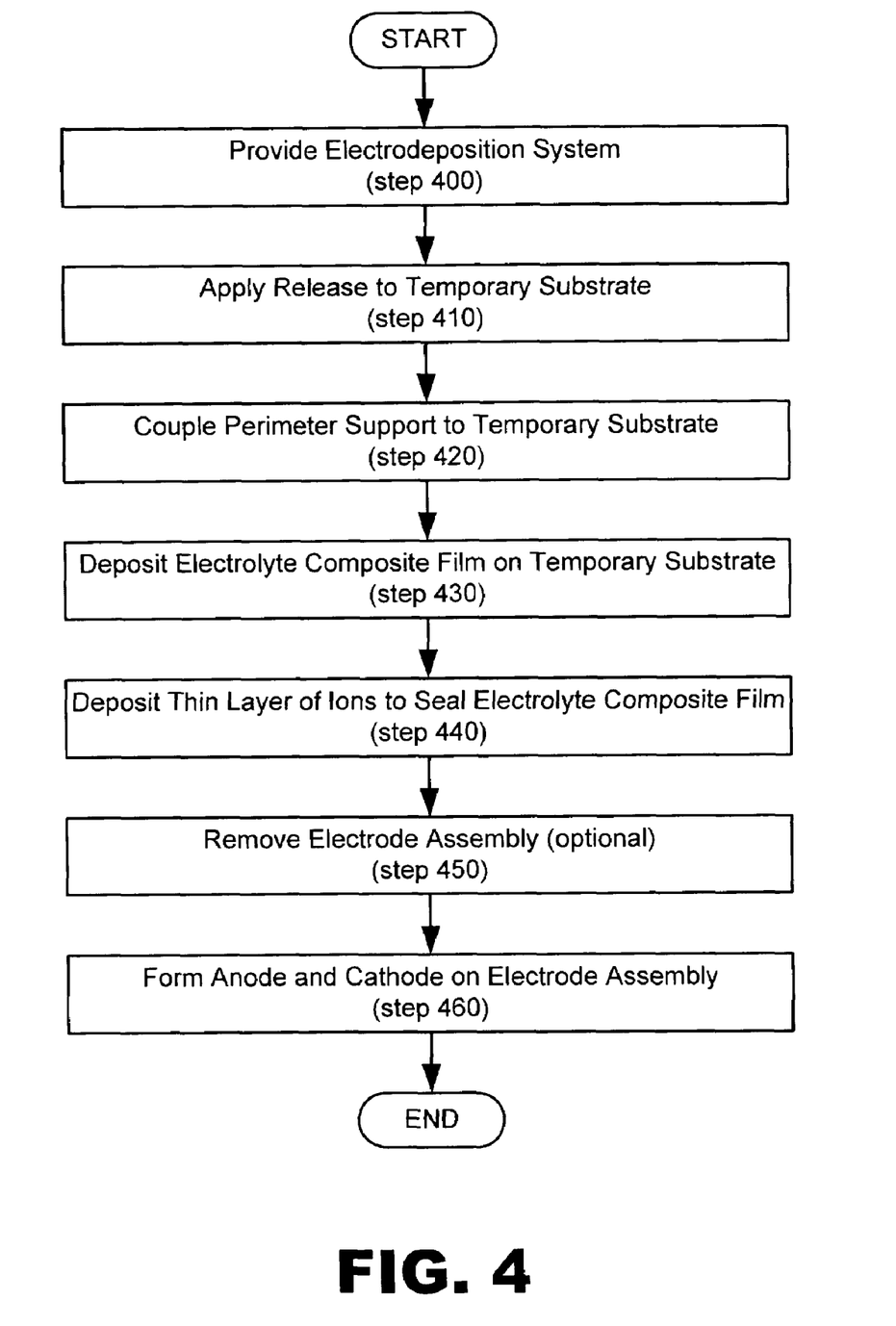
FIG. 4 is a flow chart illustrating a method forming an electrolyte assembly and membrane/electrolyte assembly according to one exemplary embodiment.

FIG. 4 is a flowchart of a method of forming a fuel cell assembly. The process begins by providing an electro deposition system (step 400). The electro deposition system includes a power source that creates opposing charges in at least two electrodes that are placed within an electro deposition container. One of the electrodes acts as a temporary substrate which is configured to have a perimeter support member coupled thereto. In the implementation contemplated in FIG. 4 and illustrated in FIG. 3, the temporary substrate is made of a metallic material, such as nickel or stainless steel, and is part of the negatively charged electrode.

The next step of the method is to apply a release to the electrode acting as a temporary substrate (step 410). The release may be any suitable type that facilitates the removable formation of a fuel cell membrane and electrode assembly on the temporary substrate. Examples of suitable releases include low surface free energy coating materials such as polytetrafluoroethylene which is commercially known as TEFLON AF.

After the release has been applied, a perimeter support is coupled to the temporary substrate (step 420). An electrolyte composite film is then deposited on the temporary substrate (step 430), which may be the negatively charged electrode in an electro deposition system such as that illustrated in FIG. 3. The opposite charge between the system electrodes creates a DC electric field in the deposition container. The electrolyte composite film is formed when charged particles (polymer and/or ceramic) are introduced in the deposition container. The charged particles are electrostatically accelerated toward the temporary substrate by the electric field and are deposited by electrophoretic deposition (EPD).

The electrolyte composite film includes polymer electrolyte particles, such as perfluorosulfonate ionomer particles, which act as a membrane for conducting ions across a fuel cell. The electrolyte composite film also includes structural particles, such as ceramic particles. The inclusion of structural particles in the electrolyte composite film makes the electrolyte composite film more robust while allowing proper function of the electrolyte composite film. A relatively thin layer of ions is then deposited on the electrolyte composite film (step 440).

The thin layer of ions is deposited by electrolytic deposition (ELD) wherein positively charged ions of relatively low molecular weight are deposited on the electrolyte composite film. The deposited species, unlike the particles previously described, is dissolved in the deposition bath fluid. The species may be, but is not limited to, the same chemical composition and molecular structure of the particles deposited as described in above (step 430), but may be of lower molecular weight to facilitate ample infiltration and coating of the composite membrane. The thin layer of ions seals and insulates the electrolyte composite film. The insulation of the outer surface of the electrolyte composite film prevents the "short circuiting" of an MEA of a fuel cell incorporating the electrolyte composite film.

When coupled to a cathode and an anode, any surface of the electrolyte composite film that is not completely insulated will act as an electrical conduit between the anode and the cathode. This conduction between the anode and cathode prevents the release of electrons into the outer circuit. This short circuit is prevented by the electrolytic deposition of the thin layer of ions as the outer surface of the electrolyte composite film.

The formation of the thin layer of ions on the electrolyte composite film results in an electrolyte assembly that does not require the use of adhesives or heat pressing. As a result, the electrolyte is able to conveniently retain its hydration characteristics and consequently its performance characteristics. Further, the resulting electrolyte assembly is robust in that there is no substantial adhesive bond to fail and in that the assembly also includes structural particles. In addition, the process is easily controlled and repeatable, thereby facilitating the economical formation of membrane/electrode assemblies according to the present method.

Once the electrolyte composite and electrolyte deposition are complete, the electrolyte assembly is removed (step 450). The release applied as described above (step 410) facilitates the removal of the electrolyte assembly as an integral unit. Such a removal decreases the time necessary to form the electrolyte assembly, thereby further facilitating the economical formation of electrolyte assemblies, and thus fuel cell systems.

Once the electrolyte assembly is removed, an anode and a cathode may be coupled thereto in order to form a membrane/electrode assembly (MEA) (step 460). In some embodiments, the electrolyte assembly is not removed at this point, but rather the anode and/or cathode are then formed in the same container.

A MEA formed according to the above-mentioned method will have a number of advantages when incorporated in a fuel cell. First, the incorporation of the ceramic particles in the electrolyte will provide structural integrity to the MEA. Moreover, since the polymer electrolyte material is substantially confined to the electrolyte composite film, the degree of swelling that may occur during the power production process is limited by the quantity of polymer electrolyte material used. Moreover, because the above-mentioned process forms the polymer electrolyte material while in an aqueous solution and with little application of heat, the likelihood of dehydration of the polymer electrolyte is reduced. This reduction in the likelihood of dehydration of the polymer electrolyte may reduce the detrimental impact of the re-hydration process of the MEA during operation, specifically in regards to electrolyte layer adhesion, overall mechanical integrity, and susceptibility to fuel crossover.

Figure 5A:
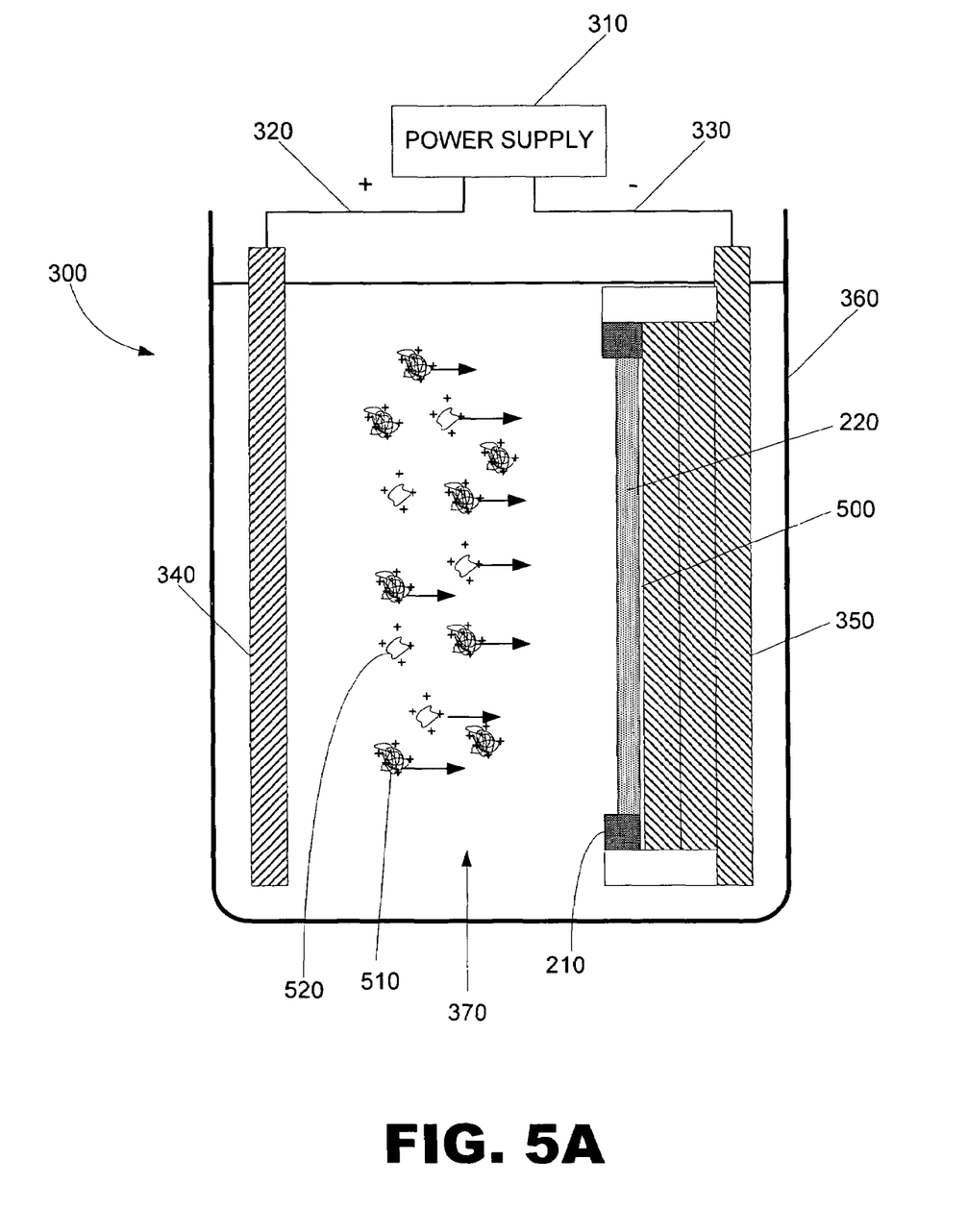
FIG. 5A is a cross-sectional view illustrating the electrophoretic deposition of electrolyte composite film according to one exemplary embodiment.

The exemplary method illustrated in FIG. 4 will now be described in further detail with reference to FIGS. 5A, and 5B. FIG. 5A illustrates an electro deposition system (300) in which an electrolyte composite film (220) is being formed on a temporary substrate electrode (350) as part of the formation of an electrolyte assembly (200, FIG. 2). A release layer (500) has been applied to the temporary substrate electrode (350) and a perimeter support (210) has been coupled thereto. The electrodes (340, 350) are charged by the power supply (310). The opposite charge between the electrodes (340, 350) creates a DC electric field in the deposition container (360). The electrolyte composite film (220) is formed when charged polymer electrolyte particles (510) and ceramic particles (520) are introduced in the deposition container (360). The charged particles are electrostatically accelerated toward the negatively charged electrode (350) by the electric field resulting in the EPD of the charged particles. The charged particles of are sufficient size that they do not dissolve in the solution.

Figure 5B:
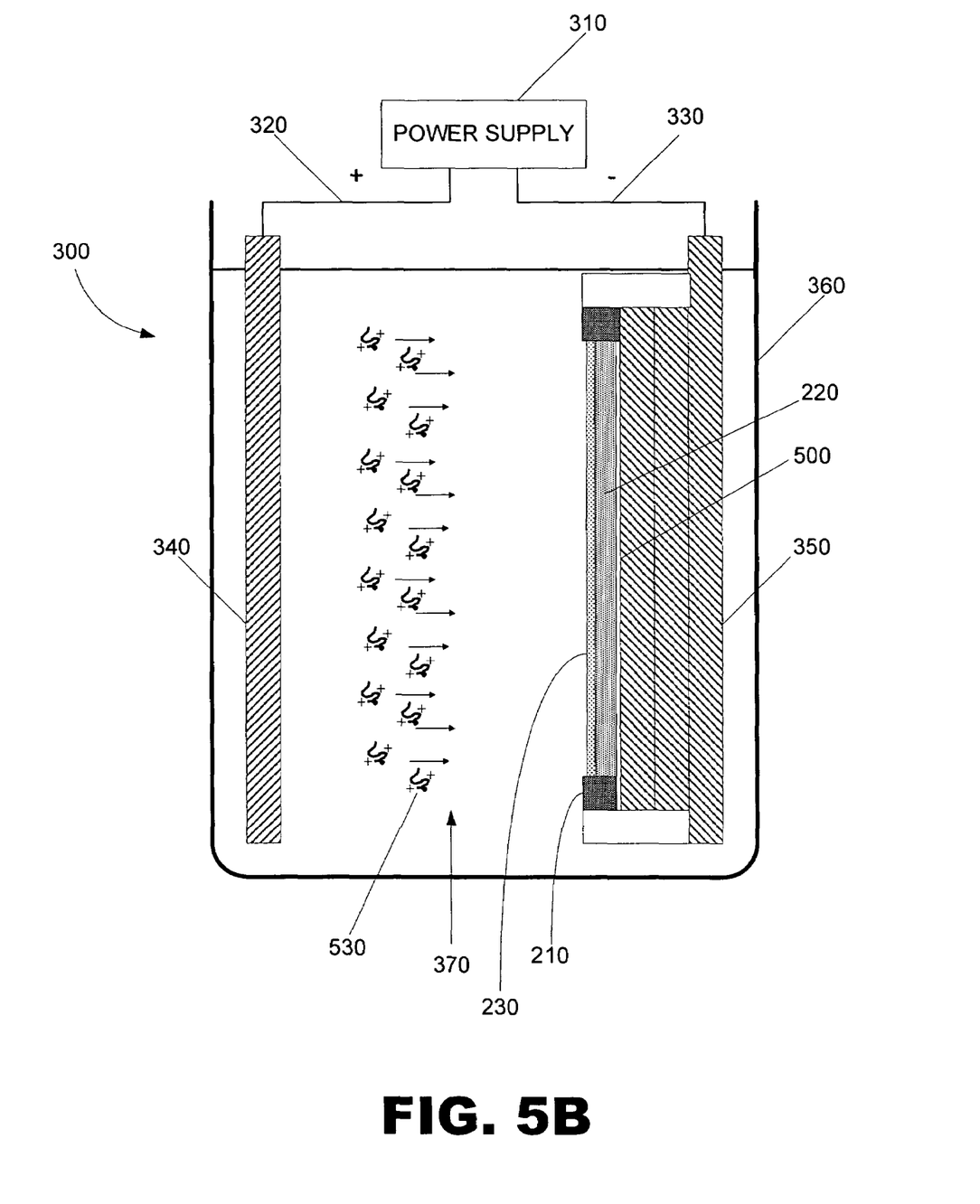
FIG. 5B is a cross-sectional view illustrating the electrolytic deposition of a layer of ions according to one exemplary embodiment.
Figure 6A:
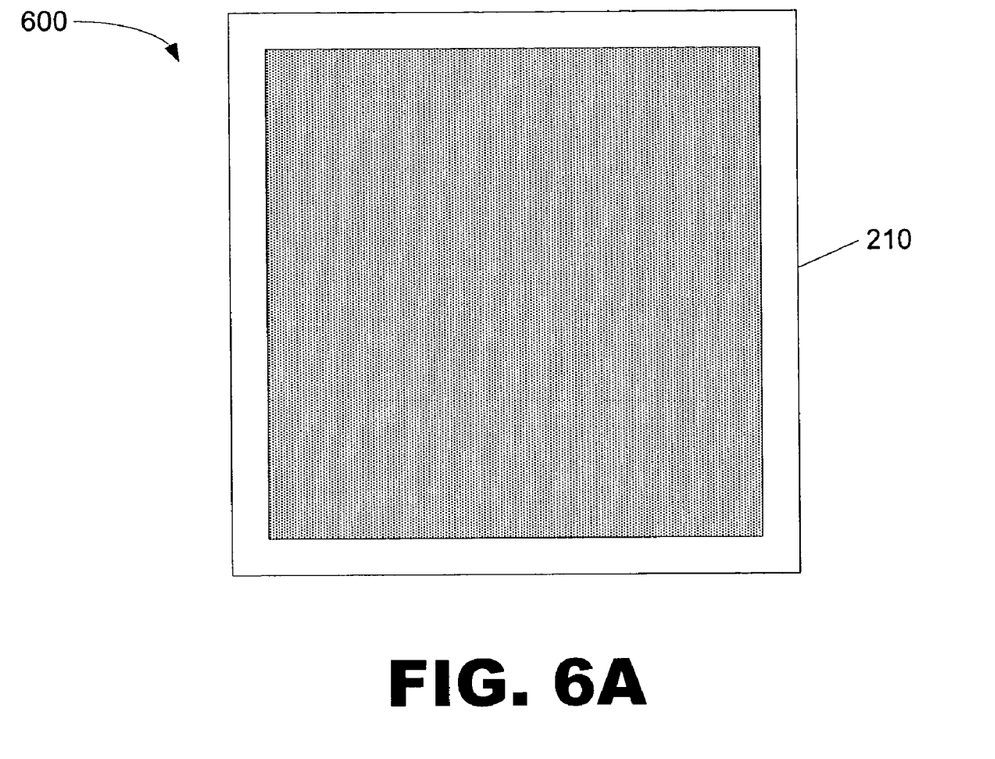
FIG. 6A is a plane view of a membrane/electrode assembly according to one exemplary embodiment.

FIG. 5B illustrates an electro deposition system (300) in which an ion layer (230) is deposited as a second step in the formation of an electrolyte assembly (200, FIG. 2). The ion layer (230) shown is exaggerated in size for purposes of illustration only. The ion layer (230) formed by introducing ions (530) to the deposition container (360) following the formation of the electrolyte composite film (220). The ions (530), which are in solution, are electrostatically accelerated toward the negatively charged electrode (350) and are electrodeposited on the electrolyte composite film (120) by ELD. The ion layer (230) completely seals the electrolyte composite film (220) as discussed above. This sealed electrolyte assembly (200) may then be incorporated into a MEA (600, FIG. 6).

Figure 6B:
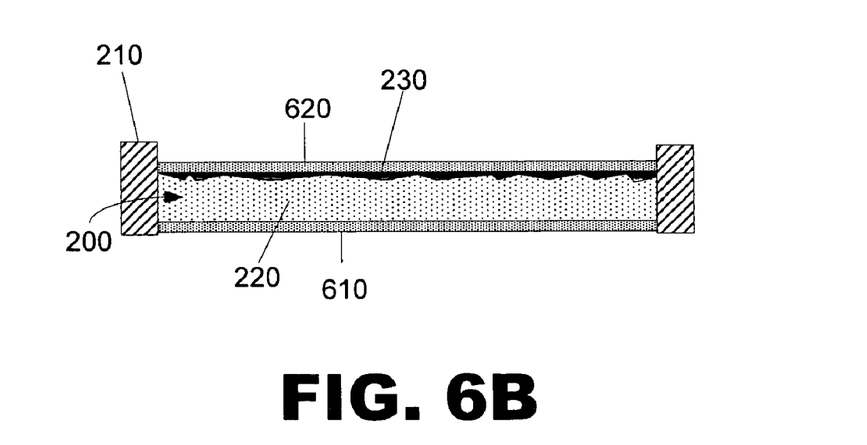
FIG. 6B is a cross-sectional view of a membrane/electrode assembly according to one exemplary embodiment.

FIGS. 6A-B illustrate a MEA (600) formed utilizing an electrolyte assembly (200) supported by a perimeter support (210) that supports an electrolyte composite film (220). The electrolyte assembly (200) serves as a proton exchange member. On either side of the electrolyte assembly (200) are electrodes, including anode (610) and cathode (620). The ceramic particles (520, FIG. 5A) give the electrolyte assembly (200) sufficient structure such that the anode (610) and cathode (620) may be formed directly on the electrolyte assembly (200).

The anode (610) and cathode (620) may be formed by any suitable means, including electro deposition. Further, the configuration of the anode (610) and cathode (620) is for illustration purposes only, and may be formed in switched positions with respect to the electrolyte assembly (200). The MEA (600) may be utilized in systems similar to that illustrated in FIG. 1 by substituting the MEA shown in FIG. 6 (600) with the MEA of FIG. 1 (110, FIG. 1).

The present MEA (600) has a number of advantages when incorporated in a fuel cell system. First, the incorporation of the ceramic particles (520, FIG. 5A) in the electrolyte will provide structural integrity to the MEA (600). Moreover, because the above-mentioned process forms the electrolyte composite film (220) while in an aqueous solution and with little application of heat, the likelihood of dehydration of the polymer electrolyte is reduced. This reduction in the likelihood of dehydration of the polymer electrolyte may reduce the detrimental impact of the re-hydration process of the MEA during operation, specifically in regards to electrolyte layer adhesion, overall mechanical integrity, and susceptibility to fuel crossover. The use of a perimeter support (210), such as a gasket, allows for the precise formation of electrolyte assemblies for use in a variety of fuel cell applications. In addition, the MEA (600) may be directly placed into multilayer stacks.

The preceding description has been presented only to illustrate and describe exemplary embodiments. It is not intended to be exhaustive or to limit the exemplary embodiments to any precise form disclosed. Many modifications and variations are possible in light of the above teaching. It is intended that the scope be defined by the following claims.

What is claimed is:
1. A method of forming an electrolyte, comprising:
removably coupling a perimeter support to a temporary substrate;
electrodepositing a structural material and an electrolyte material to form an electrolyte composite film on said temporary substrate such that a perimeter of said film is supported by said perimeter support; and electrodepositing a layer of ions on said electrolyte composite film.

2. The method of claim 1, wherein said layer of ions comprises at least one of perfluorosulfonate ionomers or sulfonate polyetherketones.

3. The method of claim 1, wherein said electrodepositing of said layer of ions comprises electrolytic deposition.

4. The method of claim 1, wherein electrodepositing said layer of ions seals said electrolyte composite film.

5. The method of claim 1, wherein electrodepositing said electrolyte composite film comprises electrophoretic deposition and electrodepositing said layer of ions comprises electrolytic deposition.

6. A method of forming an electrolyte, comprising:

removably coupling a perimeter support to a temporary substrate; and electrodepositing an electrolyte composite film on said temporary substrate such that a perimeter of said film is supported by said perimeter support;

wherein said electrolyte composite film and said perimeter support comprise an electrolyte assembly and farther comprising removing said electrolyte assembly as an integral unit from said temporary substrate.

7. The method of claim 6, further comprising electrodepositing a layer of ions on said electrolyte composite film.

8. The method of claim 7, wherein said layer of ions is thinner than said electrolyte composite film.

9. The method of claim 7, wherein said layer of ions comprises part of said electrolyte assembly and is removable as part of said integral unit from said temporary substrate.

10. The method of claim 6, wherein said electrolyte composite film conducts ions when moisture is present.

11. The method of claim 6, further comprising forming a cathode and anode on opposite sides of said integral unit.

12. The method of claim 6, wherein said electrodepositing is performed by placing said temporary substrate in a solution already comprising polymer units and attracting those polymer units to said temporary substrate using an electric field.

13. The method of claim 6, wherein said electrolyte composite film comprises a structural material and an electrolyte material.

14. The method of claim 13, wherein said electrolyte material comprises perfluorosulfonate ionomer particles.

15. The method of claim 13, wherein said structural material comprises ceramic particles.

16. A method of forming a fuel cell electrolyte, comprising:

disposing a temporary substrate in a solution already comprising polymer units;

electrodepositing said polymer units on said temporary substrate so as to form said fuel cell electrolyte on said temporary substrate; and electrodepositing a layer of ions on said electrolyte composite film, wherein said layer of ions is thinner than said fuel cell electrolyte.

17. The method of claim 16, wherein said layer of ions comprises at least one of perfluorosulfonate ionomers or sulfonate polyetherketones.

* * * * *

UNITED STATES PATENT AND TRADEMARK OFFICE
CERTIFICATE OF CORRECTION

PATENT NO. : 7,504,013 B2  
APPLICATION NO. : 10/705486  
DATED : March 17, 2009  
INVENTOR(S) : David Punsalan et al.

Page 1 of 1

It is certified that error appears in the above-identified patent and that said Letters Patent is hereby corrected as shown below:

In column 7, line 23, in Claim 6, delete "farther" and insert -- further --, therefor.

Signed and Sealed this

Fourth Day of August, 2009

JOHN DOLL  
*Acting Director of the United States Patent and Trademark Office*